March 31, 1936.   L. F. DAY   2,036,025
AUTOMATIC CONTROLLING APPARATUS
Filed Nov. 9, 1934   3 Sheets-Sheet 2
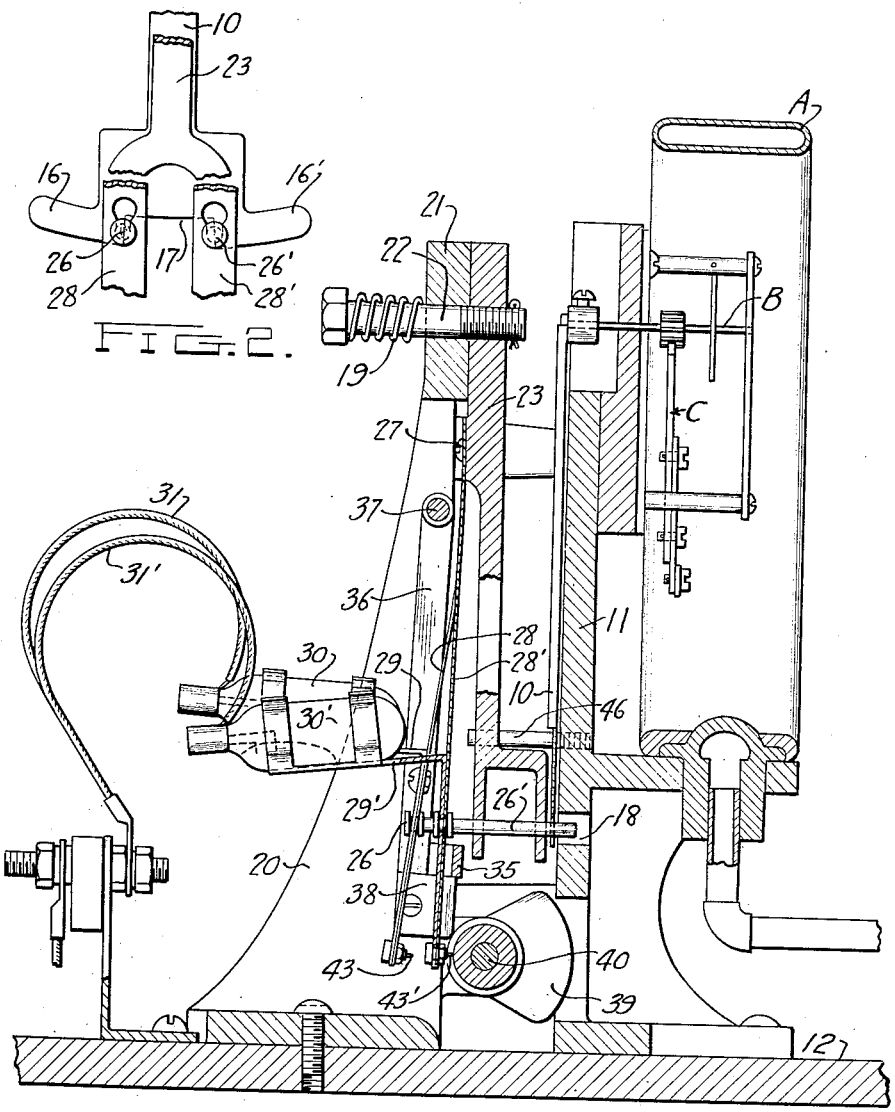
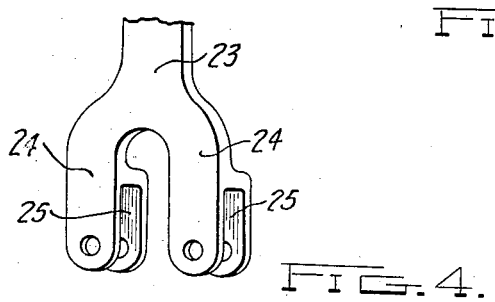
INVENTOR
L. F. Day
By
Charles A. Lind
ATTORNEY March 31, 1936. L. F. DAY 2,036,025
AUTOMATIC CONTROLLING APPARATUS
Filed Nov. 9, 1934    3 Sheets-Sheet 3
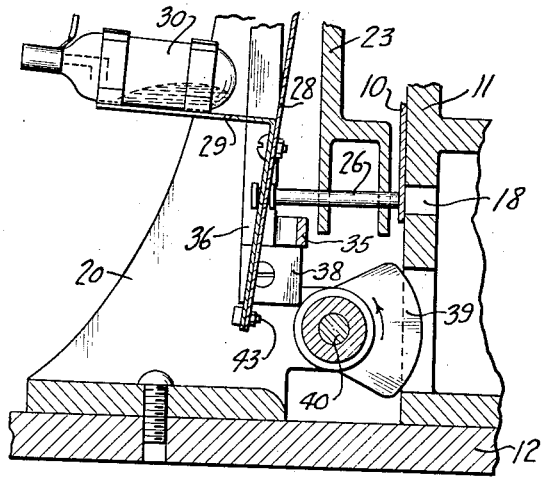
FIG. 5.
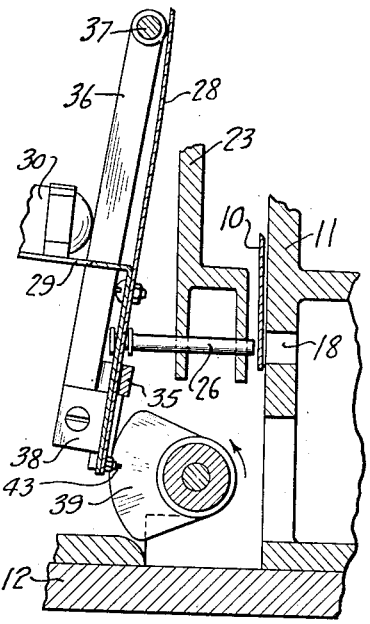
FIG. 6.
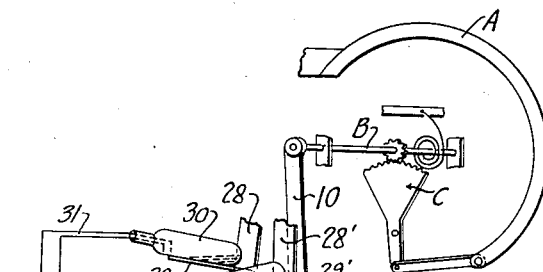
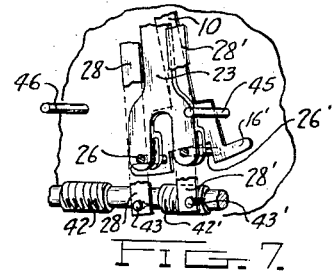
FIG. 7.
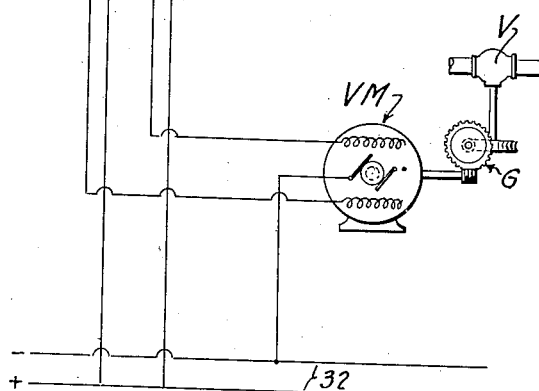
FIG. 9.
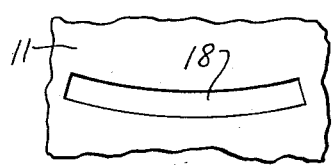
FIG. 8.
INVENTOR
L. F. Day
BY
Charles A. Lind
ATTORNEY Patented Mar. 31, 1936

2,036,025

UNITED STATES PATENT OFFICE 2,036,025

AUTOMATIC CONTROLLING APPARATUS

Luther F. Day, Tulsa, Okla., assignor to Webster Engineering Company, Tulsa, Okla., a corporation of Delaware Application November 9, 1934, Serial No. 752,331

12 Claims. (Cl. 200—81)

This invention relates to improvements in mechanism adapted to be controlled by a member which is movable in response to a change in condition such as temperature, pressure, rate of flow of a fluid, etc., whereby the mechanism may be actuated to correct the condition which causes said member to move.

The invention has for its object to provide a controlling mechanism of the character indicated which shall be relatively simple in construction and otherwise well adapted for its intended purpose. The various features of novelty and invention will best be understood by reference to the detailed description taken in connection with the accompanying drawings wherein the preferred form of the invention is shown.

Referring to the drawings—

Fig. 2 is a fragmentary view of certain parts of the apparatus;

Figure 3 is a section taken on line 3—3 of Fig. 1;

Fig. 4 is a perspective view of a certain detail of the apparatus;

Fig. 5 is a section taken on line 5—5 of Fig. 1;

Fig. 6 is a view corresponding to Fig. 5 except that the parts are in a different position;

Fig. 7 is a view illustrating certain parts in a certain position;

Fig. 8 is a fragmentary view of a detail, and

Fig. 9 is a diagrammatic view illustrating an application of the invention.

Figure 1:
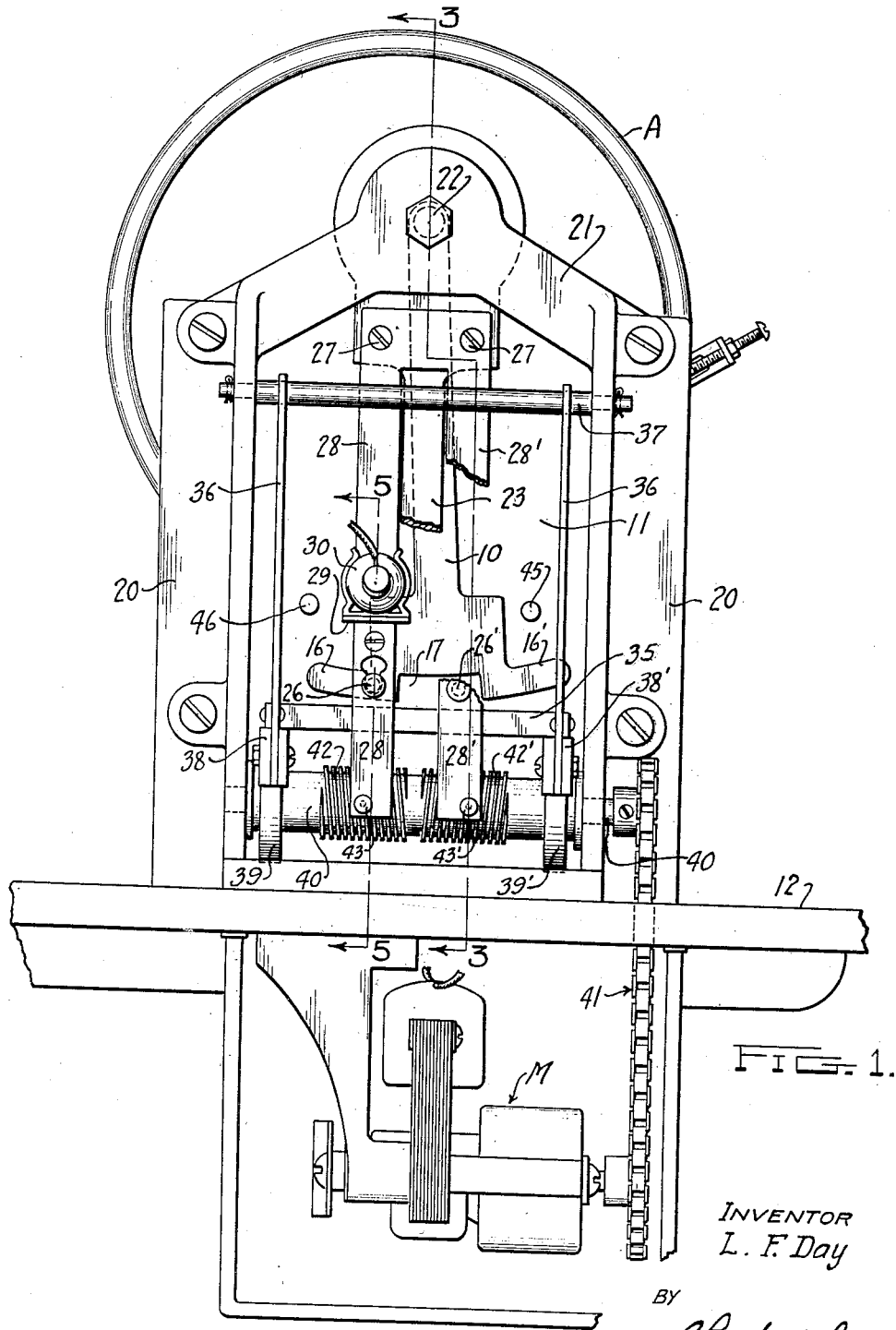
Fig. 1 is a front elevation of the improved apparatus with some parts broken away to expose other parts.

In the drawings, 10 indicates a member which is part of an instrument which is responsive to changes in condition as of temperature, pressure, etc., the instrument in the present case being shown as a pressure gauge comprising a Bourdon tube A, a spindle B, and a gear sector and pinion C for transmitting movement of said tube to the spindle.

In accordance with the present invention the member 10 comprises an arm secured at one end to the spindle B for rotation therewith, the lower end of the arm being of special configuration in that it is flat and is provided with two arcuate wings or extensions 16 and 16' separated by a gap or cut-out 17. The arm is arranged to swing in front of an upright standard 11 which at its lower end is secured to a base 12, it being noted that the spindle B extends through the upper end of the standard. Unless restrained as hereinafter explained, the arm 10 is just as free to swing as an ordinary gauge pointer or hand would be, the arm in fact taking the place of the usual pointer. The standard 11 is provided with an arcuate slot 18 opposite the gap 17 in the arm 10, the slot being about as long as the combined lengths of the wings 16 and 16' and the gap 17 for reasons presently appearing.

Spaced from the standard 11 and extending upwardly from the base 12 is an inverted U-shape standard, the two legs of which are indicated at 20 and the top connecting portion at 21. Turnably mounted in the top portion 21 of the standard is a pin 22 in axial alinement with the gauge spindle B. Suspended by the pin 22 is a depending arm 23. A coil spring 19 on the pin 22 frictionally holds the arm 23 against free swinging movement. The lower end of the arm is of the configuration shown in Fig. 4 which is to say it has two arms 24 each of which has a jaw 25. These jaws constitute supports for rods 26 and 26', respectively, the rods being slidably supported in alined holes in the respective jaws. Referring to Fig. 2, it will be noted that the distance between the centers of the rods 26 and 26' is the same as the length of the gap 17 in the member 10 and, therefore, when the arms 10 and 23 are directly opposite each other, as in Fig. 2, neither of the rods 26, 26' can enter the gap 17.

Fixedly secured to the upper end of the arm 23 as by screws 27 are two spring blades 28 and 28'. The blade 28 is interlocked with a grooved head on the rod 26 and the blade 28' is similarly interlocked with the rod 26'. These blades are so tensioned that they tend to move their respective rods toward the right as viewed in Fig. 3. Secured to the respective blades 28 and 28' are angle brackets 29 and 29' which are provided with spring clips for holding mercury switches 30, 30'. The angularity of each of said brackets is such that when the spring blade to which it is secured is at its limit of movement toward the right as viewed in Fig. 3, the mercury switch carried thereby will be closed whereas when said blade is at its limit of movement toward the left as viewed in Fig. 5, the switch will be open.

Extending in front of the spring blades 28 and 28' is horizontally extending cross bar 35, the same being swingably supported by side arms 36 the upper ends of which are supported on a cross shaft 37 which in turn is supported by the legs of the standard 20. The side arms 36 are extended below the cross bar 35 and carry shoes 38 and 38', respectively. These shoes are arranged to be wiped by similar cams 39 and 39', respectively, both mounted on a common drive shaft 40, the shaft being driven by a constant speed electric motor M through a suitable connection as by a sprocket and chain drive 41. The bar 35 therefore moves back and forth with resultant periodic movement of the spring blades toward the left as viewed in Fig. 6.

Also mounted on the drive shaft 40 are two screws 42 and 42', respectively, the one being a right-hand and the other a left-hand screw. The spring blades 28 and 28' are extended downwardly below the cross bar 35 and at their lower ends are provided with pins 43 and 43', respectively, for engagement with the respective screws 42 and 42' when the position of the bar 35 and other conditions permit as will be more fully explained hereinafter.

Referring to Fig. 9, V indicates a fuel valve or other device the operation of which is to be controlled in accordance as the gauge member or arm 10 moves in one direction or the other, and VM indicates a reversible electric motor for operating the valve through appropriate connections as gearing G. The circuit for the motor includes the mercury switches 30 and 30' and circuit wires 31 and 31', respectively, the main line circuit being indicated at 32.

Suppose now that the arms 10 and 23 are directly opposite each other as shown in Fig. 2. In this position which may be termed "neutral" position, the wings 16, 16' on the gauge arm prevent both rods 26, 26' from passing through the gap 17 by reason of the fact that the length of the gap is less than the overall distance between said rods. Therefore, so long as the arm 10 remains opposite the arm 23, neither of the said rods can move far enough toward the right as viewed in Fig. 5 to effect closing of their respective switches 30, 30' and consequently the motor VM remains deenergized.

Suppose, next, that during the interval that the cross bar 35 is at its limit of movement toward the left as viewed in Fig. 6 the gauge A by reason of change in steam pressure, for example, causes the gauge arm 10 to move out of neutral position with respect to the rod-carrying arm 23. One or the other of said rods 26, 26' will then be free to pass through the gap or cutout 17 in the gauge arm after the shaft 40 has turned sufficiently to cause the cams 39, 39' to release the cross bar 35. When one or the other of said rods has entered said gap the mercury switch associated with that rod will then be closed with the result that the motor VM will be energized to operate the fuel valve V. Suppose it is the rod 26' which has entered said gap due to the gauge arm having moved toward the right, as viewed in Fig. 9, by reason of falling steam pressure. The rotation of the motor VM following the closing of the switch 30' will then be in such direction as to increase the degree of opening of the valve V.

During the time that the rod 26' extends through the gap 17 (and consequently into the slot 18 in the standard 11) the pin 43' carried by its spring blade 28' is engaged with the left-hand thread screw 42' (see Figs. 3 and 9). As a consequence of such engagement and due to the fact that the shaft 40 is rotating in a counterclockwise direction, the spring blade and therefore the rod carrying arm 23 will be moved a short distance toward the right. In the meantime, the other rod 26 abuts the gauge arm wing 16 and therefore presses the lower end of the gauge arm against the face of the standard 11. Due to the gauge arm being thus pressed against the standard the frictional contact between the rod 26 and said wing may or may not be sufficient to cause the gauge arm also to be moved toward the right but whether the gauge arm is or is not so moved is inconsequential since as soon as the cross bar 35 comes into operation to move the spring blades 28, 28' toward the left the gauge arm will be free to assume its normal position as determined by the gauge A. The rod carrying arm 23, however, will remain in its new position by reason of being frictionally held by its pivot spring 19.

The reason for causing the rod carrying arm 23 to follow in the same direction as the gauge arm 10 after the latter has moved out of neutral position wtih respect to said arm 23 is to prevent a second successive adjustment of the valve V in case the deflection of the gauge arm 10 with respect to rod carrying arm 23 was just enough to require one adjustment of said valve. Thus suppose that during the time interval required for the shaft 40 to make one revolution the gauge arm 10 was deflected to such degree that one revolution of said shaft would cause the rod-carrying arm to be moved into neutral position with respect to said gauge arm. In such event the motor VM would obviously remain deenergized until the gauge arm again moved out of neutral position either toward the right or toward the left as the case might be.

Referring now more particularly to Figs 7 and 9, it may be assumed that when the gauge spindle B moves in a counterclockwise direction the steam pressure is falling. When the steam pressure is below a certain degree, the gauge arm 10 will engage a stop pin 45 and similarly when it is above a certain degree it will engage another stop pin 46. When the gauge arm 10 engages one or the other of these stop pins, the arrangement is such that the two arms 10 and 23 cannot be brought into opposition as in Fig. 2 but will be in such angular relation that one of the rods 26, 26' will be free to enter the gap 17 in the arm 10 until such time as the gauge arm moves away from the stop pin. Thus referring to Fig. 7, where the gauge arm 10 is shown as in engagement with the stop pin 45, it will be noted that the lower end of the blade 28' has been moved by the screw 42' sufficiently far toward the right to cause its screw engaging finger 43' to pass beyond the operative part of the said screw. As the steam pressure increases, the gauge arm 10 will move toward the left whereupon the parts will function as previously explained.

The invention has special utility in connection with steam boiler operation but, as already stated, is not limited in its application to such use. Thus the deflectible member or arm 10 instead of being associated with a steam gauge might be associated with some other instrument as for example a temperature responsive apparatus or other apparatus responsive to some other condition which it is desired to control in which case the valve V would be some other appropriate condition-controlling apparatus.

What I claim as new and desire to secure by Letters Patent is:

1. The combination comprising, a member which is deflectable in response to a change in condition as temperature, pressure, etc., means movably mounted with respect to said member and carrying two axially movable rods in radially spaced relation, means normally tending to move said rods toward and across the path of movement of said member, means for periodically moving said rods away from said path, means movable with said member for preventing more than one of said rods at a time from being projected across its path of movement, and means for moving said rod-carrying means when one or the other of said rods extends across the path of movement of said member.

2. The combination comprising, a member which is deflectable in response to a change in condition as temperature, pressure, etc., means movably mounted with respect to said member and carrying two axially movable rods in radially spaced relation, means normally tending to move said rods toward and across the path of movement of said member, means comprising a cam for periodically moving said rods away from said path, means movable with said member for preventing more than one of said rods at a time from being projected across its path of movement, and means comprising a screw for moving said rod-carrying means when one or the other of said rods extends across the path of movement of said member.

3. The combination comprising, a member which is deflective in response to a change in condition as temperature, pressure, etc., a body against which said member may be pressed for holding it against free deflection, means movably mounted with respect to said body and carrying two axially movable rods in radially spaced relation, means normally tending to move said rods toward and across the path of movement of said member, means for periodically moving said rods away from said path, means for preventing more than one of said rods at a time from being projected across the path of movement of said member and permitting the other rod to press said member against said body, and means for moving said rod-carrying means when one or the other of said rods extends across the path of movement of said member.

4. The combination comprising, a member which is deflectable in response to a change in condition as temperature, pressure, etc., means movably mounted with respect to said member and carrying two axially movable rods in radially spaced relation and also carrying two circuit-controlling devices, means normally tending to move said rods toward and across the path of movement of said member, means for periodically moving said rods away from said path, means movable with said member for preventing more than one of said rods at a time from being projected across its path of movement, means for actuating one or the other of said devices depending on which one of said rods is projected across said path, and means for moving said rod-carrying means when one or the other of said rods extends across the path of movement of said member.

5. The combination comprising, a member which is deflectable in response to a change in condition as temperature, pressure, etc., means movably mounted with respect to said member and carrying two axially movable rods in radially spaced relation, means comprising spring blades tending to move said rods toward and across the path of movement of said member, means for periodically flexing said blades in a direction away from said member, means for preventing more than one of said rods at a time from being projected across the path of movement of said member, means for moving said rod-carrying means when one or the other of said rods extends across the path of movement of said member, and means operable by the respective blades for controlling the operating condition of an electrical circuit.

6. The combination comprising, a member which is deflectable in response to a change in condition as temperature, pressure, etc., a body against which said member may be pressed for holding it against free deflection, means movably mounted with respect to said body and carrying two axially movable rods in radially spaced relation, means normally tending to move said rods toward and across the path of movement of said member, means for periodically moving said rods away from said path, means for preventing more than one of said rods at a time from being projected across the path of movement of said member and permitting the other rod to press said member against said body, a pair of screws, means for driving said screws in union, and means movable into operating relation with one or the other of said screws, depending on which of said rods is projected across the path of movement of said member, for moving said rod-carrying member with respect to said body.

7. The combination comprising, a member which is deflectable in response to a change in condition as temperature, pressure, etc., a body against which said member may be pressed for holding it against free deflection, means movably mounted with respect to said body and carrying two axially movable rods in radially spaced relation, means normally tending to move said rods toward and across the path of movement of said member, means for periodically moving said rods away from said path, means for preventing more than one of said rods at a time from being projected across the path of movement of said member and permitting the other rod to press said member against said body, and power-driven means for moving said rod-carrying means with respect to said body when either of said rods extends across the path of movement of said deflectable member.

8. The combination comprising, a member which is deflectable in response to a change in condition as temperature, pressure, etc., a body against which said member may be pressed for holding it against free deflection, a shiftable device comprising two axially movable rods in radially spaced relation and means individual to the rods for moving them toward and across the path of movement of said member, means associated with said member for preventing more than one of said rods at a time from being projected across its path of movement, said means comprising two lateral extensions separated by a gap through which latter one or the other of said rods may pass when said device and member are out of normal alinement, means for periodically moving said rods away from said member, and means for moving said device with respect to said body when one or the other of said rods extends through said gap.

9. The combination comprising, a member which is deflectable in response to a change in condition as temperature, pressure, etc., a body against which said member may be pressed for holding it against free deflection, a shiftable device comprising two axially movable rods in radially spaced relation, and means tending to project the rods across the path of movement of said member, means carried by said member for preventing more than one of said rods at a time from being projected across its path of movement and comprising two lateral extensions separated by a gap through which latter one or the other of said rods may pass when said device and member are out of normal alinement, means for periodically moving said rods away from said member, and means including a continuously rotating shaft for moving said device with respect to said body when one or the other of said rods extends through said gap.

10. The combination comprising, a member which is deflectable in response to a change in condition as temperature, pressure, etc., a body against which said member may be pressed for holding it against free deflection, said member at its free end comprising two oppositely extending segments separated by a gap, a support which is movable with respect to said body, two rods movably carried by said support in such space relation that the overall distance between the rods is greater than the length of the gap between said segments, means for periodically moving said rods back and forth with respect to said body whereby one or both of said rods may engage one or both of said segments depending of the position of said member with respect to said support, such one of said rods as does not engage one of said segments being free to pass through said gap.

11. The combination comprising, a movably supported body, a pair of rods movably supported by said body in radially spaced relation, means including a cam independent of said body and spring blades carried by said body for reciprocating said rods, power-controlling means supported by the respective blades, a member deflectable in response to a change in condition as temperature, pressure, etc., means carried by said member for limiting the length of stroke of at least one of said rods, and means for moving said body unless the means carried by said member limits the stroke of both of said rods.

12. The combination comprising, two spring blades, mercury switches carried by the respective blades, a movable support to which one end of the respective blades is fixedly secured, a member which is deflectable in response to a change in condition as temperature, pressure, etc., a pair of rods movable by the respective blades toward the path of movement of said member and across said path unless prevented by said member, a rotatable shaft, means for rotating said shaft at constant speed, means comprising a screw carried by said shaft for moving said support in case one of said rods extends across the path of movement of said member, and means for periodically moving said rods away from the path of movement of said member.

LUTHER F. DAY.